July 14, 1931.  G. R. METCALF, JR  1,814,479

CONNECTER

Filed April 4, 1928

George R. Metcalf Jr
INVENTOR

BY

ATTORNEYS.

Patented July 14, 1931

1,814,479

UNITED STATES PATENT OFFICE

GEORGE R. METCALF, JR., OF ERIE, PENNSYLVANIA, ASSIGNOR TO ERIE MALLEABLE IRON COMPANY, OF ERIE, PENNSYLVANIA, A CORPORATION OF PENNSYLVANIA

CONNECTER

Application filed April 4, 1928. Serial No. 267,439.

This invention is designed to facilitate the connection of members, one of which is a threadless member. As an example of such a connecter I have illustrated the invention as a conduit fitting for a threadless conduit. Features and details of the invention will appear from the specification and claims.

A preferred embodiment of the invention is illustrated in the accompanying drawings as follows:—

Figure 1:
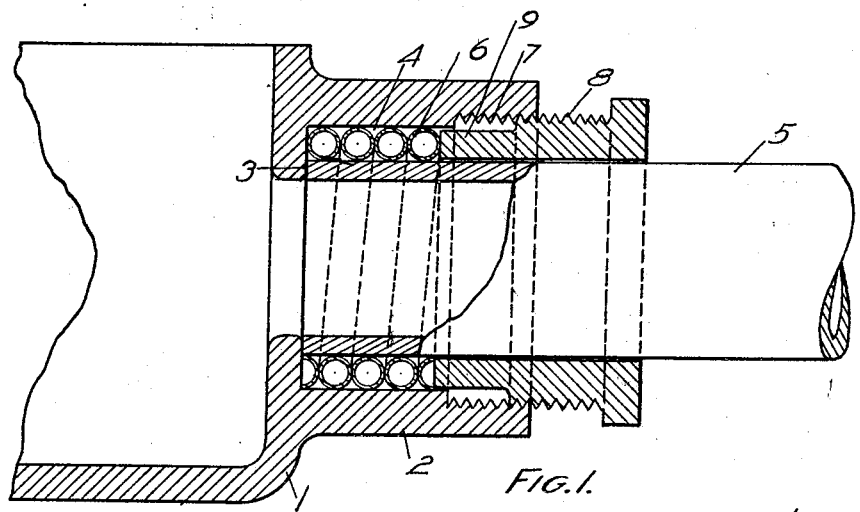
Figure 3:
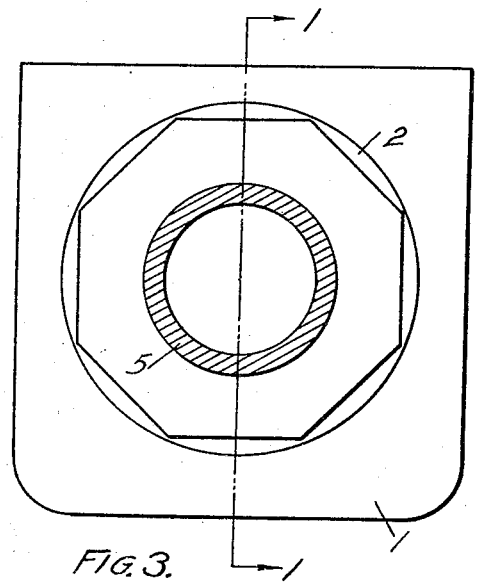

Fig. 1 shows a section on the line 1—1 in Fig. 3, and showing the parts prior to locking the parts together.

Figure 2:
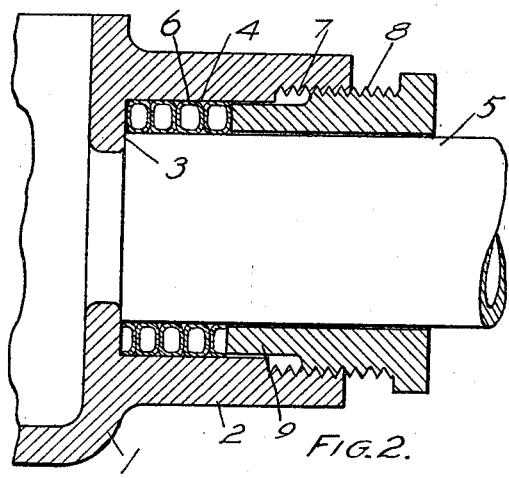

Fig. 2 a similar view with the parts in locked position.

Fig. 3 an end view of the fitting.

Figure 4:
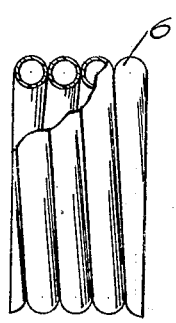

Fig. 4 a side elevation, partly in section, of the locking member.

1 marks a body of the fitting, as shown, a conduit box. This is provided with an extension 2 and a guard shoulder 3 thus forming a socket 4 within the extension into which a conduit 5 is inserted.

A coil 6 formed of tubular material is arranged in the socket. Preferably it is of resilient steel.

The outer end of the extension is screw-threaded at 7 and a screw 8 operates in the screw thread 7. The screw 8 has an extension 9 which engages the outer end of the coil.

As the screw is set up, the coil is compressed, thus distorting the cross shape of the tube of which the coil is formed and this distortion forces a change in the radial dimension of the coil and in as much as the outer wall prevents the expansion in the exemplification shown the coil is contracted into clamping engagement with the conduit.

What I claim as new is:—

1. In a connecter, the combination of a coil formed of a tube of hard resilient metal; and means compressing the coil axially distorting the cross shape of the tube to force the walls of the coil radially into clamping engagement with a member to be connected.

2. In a connecter, the combination of a surrounding wall; a coil formed of a tube within the wall, said tube being of hard resilient metal; and means compressing the coil distorting the cross shape of the tube to contract the coil into clamping engagement with an inserted member.

In testimony whereof I have hereunto set my hand.

GEORGE R. METCALF, JR.